United States Patent
Meyer et al.

(10) Patent No.: US 11,022,967 B2
(45) Date of Patent: Jun. 1, 2021

(54) METHOD FOR GENERATING A TECHNICAL SYSTEM MODEL, EXECUTABLE ON A TEST UNIT, AND THE TEST UNIT

(71) Applicant: dSPACE digital signal processing and control engineering GmbH, Paderborn (DE)

(72) Inventors: Bjoern Meyer, Paderborn (DE); Irina Zacharias, Paderborn (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 376 days.

(21) Appl. No.: 16/004,564

(22) Filed: Jun. 11, 2018

(65) Prior Publication Data

US 2019/0072946 A1   Mar. 7, 2019

(30) Foreign Application Priority Data

Sep. 1, 2017  (EP) ..................................... 17188999

(51) Int. Cl.
*G05B 9/02* (2006.01)
*G05B 23/02* (2006.01)
(Continued)

(52) U.S. Cl.
CPC ......... *G05B 23/0243* (2013.01); *G05B 17/00* (2013.01); *G06F 8/48* (2013.01);
(Continued)

(58) Field of Classification Search
CPC .... G05B 23/0243; G05B 17/00; G05B 17/02; G05B 2219/23446; G05B 2219/2604; G05B 2219/2637; G06F 2117/08; G06F 30/15; G06F 30/20; G06F 8/48; G06F 9/54

See application file for complete search history.

(56) References Cited

U.S. PATENT DOCUMENTS 8,739,049 B2   5/2014   Kropinski et al.
2004/0078180 A1   4/2004   Allen et al.
(Continued)

FOREIGN PATENT DOCUMENTS

DE   10 2011 101 920 A1   11/2011
DE   10 2012 108 490 A1   3/2014
EP   1 489 531 A   12/2004

OTHER PUBLICATIONS

Extended European Search Report for European Application No. 17188999.1 dated Feb. 16, 2018 with English translation.

*Primary Examiner* — Zhipeng Wang
(74) *Attorney, Agent, or Firm* — Muncy, Geissler, Olds & Lowe, P.C.

(57) ABSTRACT

A method for generating a technical system model executable on a test unit, wherein the test unit and the executable model are designed for real-time-capable testing of a control unit connected to the test unit, and wherein the executable model is constructed from a plurality of executable submodels communicating with each other, wherein each executable submodel has a separate address space and/or is executed on a separate processor or separate processor core when a test of a control unit connected to the test unit is being run.

19 Claims, 4 Drawing Sheets

(51) Int. Cl.
  *G05B 17/00*   (2006.01)
  *G06F 9/54*    (2006.01)
  *G06F 8/41*    (2018.01)
  *G06F 30/15*   (2020.01)
  *G06F 30/20*   (2020.01)
  *G06F 117/08*  (2020.01)

(52) U.S. Cl.
  CPC ............... G06F 9/54 (2013.01); G06F 30/15 (2020.01); G06F 30/20 (2020.01); *G05B 2219/23446* (2013.01); *G05B 2219/2604* (2013.01); *G05B 2219/2637* (2013.01); *G06F 2117/08* (2020.01)

(56) References Cited

U.S. PATENT DOCUMENTS

| | | | | |
|---|---|---|---|---|
| 2005/0028133 A1* | 2/2005 | Ananth | ............... | G06F 30/20 717/105 |
| 2009/0326904 A1* | 12/2009 | English | ............... | G06F 30/20 703/17 |
| 2015/0019191 A1* | 1/2015 | Maturana | ........... | G05B 19/0423 703/13 |
| 2016/0062861 A1* | 3/2016 | Tegethoff | .............. | G06F 11/261 714/28 |
| 2017/0045865 A1* | 2/2017 | Naundorf | ................ | G05B 17/02 |
| 2017/0060111 A1* | 3/2017 | Tegethoff | ............... | G05B 17/02 |
| 2017/0242409 A1* | 8/2017 | Tegethoff | ................ | G06F 9/455 |
| 2018/0281598 A1* | 10/2018 | Shu | ...................... | G05B 19/042 |
| 2018/0349539 A1* | 12/2018 | Cheng | .................... | G06F 30/20 |

* cited by examiner

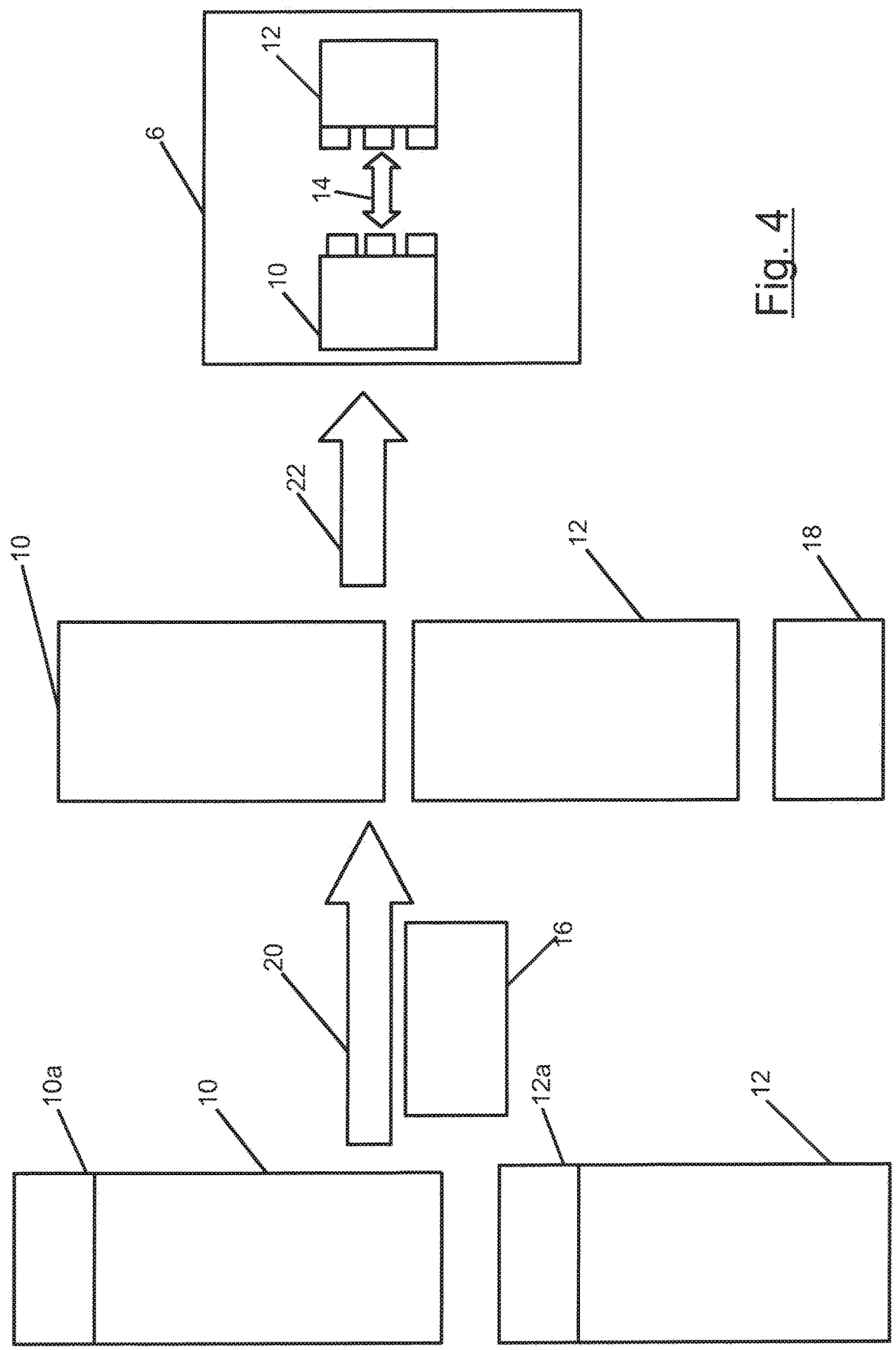

METHOD FOR GENERATING A TECHNICAL SYSTEM MODEL, EXECUTABLE ON A TEST UNIT, AND THE TEST UNIT

This nonprovisional application claims priority under 35 U.S.C. § 119(a) to European Patent Application No. EP 17188999.1, which was filed in European Patent Office on Sep. 1, 2017, and which is herein incorporated by reference.

BACKGROUND OF THE INVENTION

Field of the Invention

The present invention relates to the development of control units as they are used, e.g., in the automotive industry or in the aviation industry for controlling technical system such as, e.g., engines or brakes. The present invention relates in particular to test units used in the control unit development process.

Description of the Background Art

The development of control units has become a highly complex process. New control units or new control functions should thus be tested as early in the development process as possible in order to check the general functionality and to set the direction for further development. It is important toward the end of the development process to test the already far developed control unit as comprehensively as possible in order to make necessary modifications based on the test results before the control unit is placed in use or goes into mass production, so that it functions as desired under all circumstances in later operation.

So-called hardware-in-the-loop simulators (HIL simulators) are used at a very late stage of the development process. Such HIL simulators contain a model of the technical system to be controlled, the model being present in the software. In addition, the HIL simulator may include further models of technical systems located in the environment of the control unit and the technical system to be controlled and interacting with the control unit and/or the technical system to be controlled. The HIL simulator further also contains an input/output interface to which the control unit, which has already undergone extensive development and is already physically present in the hardware, also referred to as a hardware implementation of the control unit, can be connected. The functionality of the control unit can now be tested in various simulation runs, wherein it is possible to observe the reactions of the model of the technical system to be controlled to the signals of the control unit, and the reactions of the control unit to the events predefined by the model of the technical system to be controlled. Optionally, the behavior of further technical systems from the environment of the control unit and of the technical system to be controlled can also be observed. In this process, it is possible to simulate both the normal operation and faults in the technical system to be controlled as well as faults in the control unit, as well as faults in the communication between the control unit and the system to be controlled, such as, e.g., a cable bridge, as well as faults in the power supply, such as, e.g., short circuits. The HIL simulator is an example of a test unit set up for control unit development.

The cost of preparing an HIL simulation is generally very high, especially if a plurality of submodels interact in the HIL simulator. In preparing the simulation, the communication between the submodels is configured. After the submodels have been compiled, an integrated technical system with which the control unit can interact then results for the control unit connected to the HIL simulator. The high cost of this process is particularly relevant or detrimental when different variants are to be tested or when individual parts of the technical system model are to be replaced.

SUMMARY OF THE INVENTION

It is therefore an object of the present invention to make the creation of a technical system model executable on the test unit more flexible. In addition, it is also an object to provide a test unit that enables a more flexible creation of the model executable on the test unit.

Exemplary embodiments of the invention comprise a method for generating a technical system model executable on a test unit, wherein the test unit and the executable model are designed for real-time-capable testing of a control unit connected to the test unit, and wherein the executable model is constructed from a plurality of executable submodels communicating with each other, wherein each executable submodel has a separate address space and/or is executed on a separate processor or separate processor core when a test of a control unit connected to the test unit is being run. In this case, the method has the following steps, which are carried out after the compilation of high-level-language submodels into the executable submodels: (a) identifying communication characteristics of the particular executable submodel for each of the plurality of executable submodels; (b) accessing communication definitions for the communication between the executable submodels; (c) configuring communication interfaces of the plurality of executable submodels based on the communication characteristics of the executable submodels and the communication definitions for the communication between the executable submodels; and (d) establishing at least one real-time-capable communication link between the executable submodels based on the communication characteristics of the executable submodels and the communication definitions for the communication between the executable submodels.

The method of the invention makes it possible to establish communication links between the submodels after the submodels have been compiled, i.e., at a stage in which the submodels are already present in compiled form, so that they can be executed on the test unit. Compared with earlier approaches in which the submodels were compiled and the executable model was created after communication between the submodels was established, the method of the invention eliminates the need to recompile the submodels in the case of relatively small changes in the overall simulation. For example, individual submodels can be replaced by similar submodels, or different variants can be tested with respect to communication between the submodels without the unchanged submodels having to be recompiled. An accelerated handling of different simulation variants or an accelerated replacement of submodels is thus made possible.

Establishing communication links between the submodels is based on communication characteristics, on the one hand, and communication definitions, on the other. Together, the communication characteristics and the communication definitions contain sufficient information to establish the communication between the executable submodels. It is not necessary to know the exact structure of the submodels beyond the communication characteristics in order to establish the communication links. Thus, the establishing of communication links is not detrimentally affected by the fact that the submodels exist as executable compilations and are not just compiled with the knowledge of the desired communication links.

The term 'communication characteristics' can refer to the constitution inherent in a submodel in terms of its communication capabilities. The term 'communication characteristics' may include, for example, the properties of variables which are present in the respective submodel and are available for transmission to other submodels. The communication characteristics may include the accuracy of such a variable, e.g., determined by data type and data width, as well as the frequency of creating a corresponding value of the variable. The communication characteristics may also contain the communication direction, i.e., the suitability of the submodel as sender or receiver for a particular variable, as well as the assignment to internal processes within a submodel. This will be described in detail below.

The term 'communication definitions' can refer to the linking of multiple submodels. Thus, for example, the communication definitions may include identifying the communication partners, i.e., identifying two or more submodels to be connected with respect to a particular data exchange. It is also possible that further features of the communication are specified via the communication definitions, such as, e.g., the bundling of data or the way in which transmitted data are taken into account on the receiver side. This as well will be described in detail below. The communication definitions may be set by the user for a desired simulation and/or determined by appropriate files/algorithms.

Based on the communication characteristics and the communication definitions, communication interfaces are configured and communication links established. The term 'communication interface' describes a communication point of an executable submodel, via which the executable submodel can interact with other submodels while the simulation is running. In contrast, the term 'communication link' relates to the data exchange between submodels while the simulation is running. This data exchange takes place between separate address spaces and/or between separate processors or separate processor cores.

The executable submodels can be in binary code. It is also possible that the executable submodels exist in machine code, i.e., in assembler. The executable submodels are present in a format that is executable directly on a processor. Compared with a description of the submodels in a high-level programming language, the executable submodels are compiled.

The step of identifying the communication characteristics of the particular executable submodel can include analyzing a metafile associated with the particular executable submodel. Analyzing a metafile associated with the particular executable submodel and containing data regarding the communication characteristics of the submodel represents an efficient option for identifying the communication characteristics. The metafile can directly contain the communication characteristics. It is also possible that the metafile contains data from which the communication characteristics can be deduced. It is also possible additionally/alternatively to analyze the particular executable submodel and to extract the communication characteristics therefrom. It is possible further to analyze the high-level-language submodel that formed the basis for the executable submodel, and to extract from it the communication characteristics of the executable submodel. It is also possible in addition that the communication characteristics are at least partially determined by user inputs.

The method also comprises the step of creating at least one executable submodel by compiling and generating at least one metafile, associated with the at least one executable submodel, during the compilation. In other words, the metafile associated with a given executable submodel has been created during the compiling of the high-level-language submodel. Thus, creating an executable submodel and assembling the communication characteristics relevant for the later establishing of communication links can be efficiently combined.

The step of accessing communication definitions for the communication between the executable submodels can include receiving at least one user input of communication definitions. In other words, the communication definitions can be user-defined. In this way, communication paths selected during the preparation of the simulation can be defined or specifications for specific communication paths can be made, whereby an efficient and meaningful later simulation can be furthered by the user's expertise and the corresponding communication definitions. As already indicated above, it is also possible to provide the communication definitions by appropriate files or by appropriate algorithms.

The technical system model executable on the test unit is a model of a technical system to be controlled. In other words, the technical system model is a model of a technical system that is controlled by a control unit in later operation. In this case, the model as a whole can be controlled by the control unit connected to the test unit. But it is also possible that the model of the technical system has a part to be controlled and has other parts that are not or not directly controlled by the connected control unit. For example, the executable model of the technical system may be a model of a combination of an engine and a transmission. The control unit connected to the test unit for the simulation may be, for example, an engine control unit or a transmission control unit or a combined engine and transmission control unit. The executable submodels can correspond to subsystems of the technical system to be controlled. In the present example, one executable submodel may be a model of the engine, whereas another executable submodel is a model of the transmission.

The at least one real-time-capable communication link between executable submodels can be established for consistent data transmission by means of consistency buffers and communication packets. In this case, the term 'communication packet' denotes a data unit that is jointly directed to an executable submodel specified as a receiver or is jointly directed to a subcomponent of the executable submodel specified as a receiver. This bundling as a communication package may refer to a joint transmission during the execution of the simulation. In contrast, the term 'consistency buffer' can refer to a data unit that corresponds to the same point in time in the simulated time. In particular, the consistency buffer can refer to data present in an executable submodel at the same simulated time. The use of consistency buffers and communication packets allows efficient implementation of a real-time-capable test with the simulation device and efficient real-time-capable communication of the executable submodels with each other.

The communication characteristics of the particular executable submodel can comprise at least one of the parameters: communication direction, data type, data width, and assignment to a conditionally executable component of the submodel. Conditionally executable components of submodels may also be referred to as Conditional Execution Fragments (CEFs). They represent subcomponents of the submodels, as described in detail below.

Each communication interface of the plurality of executable submodels can be configured with respect to at least one of the parameters: communication direction, data type, data width, and assignment to a conditionally executable component of the submodel. Thus, a communication interface in a given executable submodel may be configured such that it corresponds to the communication characteristics of the particular executable submodel. The configuration of communication interfaces is associated with the communication definitions in such a way that communication interfaces are configured only for those communication characteristics of the executable submodels that are desired according to the communication definitions for the intended simulation.

The communication definitions for at least one instance of a communication between the executable submodels can comprise, for example, at least one or more of the following parameters: specifying at least two executable submodels communicating with each other, bundling communication data and/or communication receivers in communication packets, and defining the receiving mode, in particular differentiating between a continuous and event-controlled receiving mode. As stated above, the term 'communication packet' can refer to a data unit that is transmitted jointly to one or more receivers. Thus, a more efficient data flow between the submodels can be achieved via the communication definitions. By defining the receiving mode, it can be specified for the receiver submodel whether the calculations taking place in the submodel are carried out continuously or whether the submodel merely reacts to changed conditions in the connected submodels. Thus, the computational load can be limited to a required level and an overall more efficient simulation can be achieved.

According to an exemplary embodiment, steps (c) and (d) are carried out at runtime of a test of a control unit connected to the test unit. In particular, steps (c) and (d) are carried out during an initialization phase of the test of a control unit connected to the test unit, or during the initialization phase of a real-time-capable simulation or application, therefore, once in the initialization phase of the real-time-capable simulation. Accordingly, the configuration of communication interfaces of the plurality of executable submodels and the establishing of at least one real-time-capable communication link are carried out relatively shortly before the actual simulation is carried out, a replacement of individual submodels or an adapting of communication between the individual submodels to a particular simulation variant being possible until relatively shortly before the simulation is carried out.

Steps (c) and (d) can comprise: creating a mapping file based on the communication characteristics of the executable submodels and the communication definitions for the communication between the executable submodels, wherein the mapping file contains submodel-internal information and information for inter-submodel communication, and configuring the communication interfaces of the plurality of executable submodels, as well as establishing the at least one real-time-capable communication link between the executable submodels based on the mapping file. A mapping file of this kind is a good option for linking the communication characteristics and the communication definition and for providing them in a well-defined format for configuring the communication interfaces and establishing the at least one real-time-capable communication link. This mapping file further allows the time decoupling of steps (a) and (b) from steps (c) and (d), so that steps (c) and (d) can be carried out shortly and simply before the simulation.

The mapping file for the executable submodels functioning as receivers can have a specification of the communication packets to be received. Thus, the communication, to be executed during the simulation, between the executable submodels is already defined in a rather specific way in the mapping file. In this context, specification can be understood to mean that the mapping file defines which communication packets are to be received by a specific submodel. This does not meant that the specific content to be communicated can already be determined from the mapping file.

The mapping file for the executable submodels functioning as the sender can have a specification of the data blocks to be transmitted together. In this case, the data blocks to be transmitted together can contain consistent data regarding the real-time-capable testing. Such consistent data are also called a consistency buffer. The data consistent with respect to real-time-capable testing may belong to the same simulation step, i.e., belong to the same iteration step of the simulation of the technical system model. Thus, the mapping file can again describe in a rather specific way the communication, resulting during the simulation, between the executable submodels. The implementation during the initialization of the simulation or during the simulation itself can then take place in an efficient manner.

Exemplary embodiments of the invention can also comprise a combination of an executable submodel of a model, executable on a test unit, of a technical system to be controlled and a metafile which is associated with the executable submodel and contains communication characteristics of the executable submodel, wherein, when at least one further executable submodel is present and based on communication definitions for the communication between the executable submodel and the further executable submodel, a real-time-capable communication link for the executable submodel can be created according to the communication characteristics of the metafile. As explained above, such a combination of an executable submodel and a metafile associated with the executable submodel, when coupled to other such combinations, represents an advantageous starting point for generating a model executable on a test unit. The modifications, further features, and effects described above with respect to the method for generating a model executable on a test unit apply analogously to said combination.

Exemplary embodiments of the invention can also comprise a test unit for real-time-capable testing of a control unit which is connected to the test unit and comprises a plurality of combinations, as described in the preceding paragraph. The modifications, further features, and effects described above with respect to the method for generating a model executable on a test unit apply analogously to the test unit for real-time-capable testing of a control unit connected to the test unit.

The method can be used for generating a technical system model that can be executed on a test unit, wherein the test unit and the executable model are designed for real-time-capable control of a device connected to the test unit, and wherein the executable model is constructed from a plurality of executable submodels communicating with one another, wherein each executable submodel has a separate address space and/or is executed on a separate processor or processor core when a device connected to the test unit is controlled, wherein the method has the following steps, which are carried out after the compilation of high-level-language submodels into the executable submodels: (a) identifying communication characteristics of the particular executable submodel for each of the plurality of executable submodels, (b) accessing communication definitions (16) for the communication between the executable submodels, (c) configuring communication interfaces (110, 112, 114, 128, 130, 132) of the plurality of executable submodels based on the communication characteristics of the executable submodels and the communication definitions for the communication between the executable submodels, and (d) establishing at least one real-time-capable communication link (14) between the executable submodels based on the communication characteristics of the executable submodels and the communication definitions for the communication between the executable submodels.

The method can be used as part of a rapid control prototyping test (RCP test). Rapid Control Prototyping (RCP) is a development step that takes place more toward the beginning of the development process. In RCP, the test unit is used in the role of the control unit. The test unit contains a model of the control unit to be tested or in the development process. Because of the early stage of development, the model of the control unit to be tested is still fairly rudimentary in comparison with the later final control unit. There is also normally no hardware implementation of the control unit; rather, the model, present in the test unit, of the control unit to be tested is a software model. The test unit can be connected via an input/output interface to the technical system to be controlled itself or to the previously available control unit for the technical system to be controlled. In the first case, there is a direct connection between the control unit to be tested, in the form of a software model, and the physically present technical system to be controlled. In the second case, the previously available control unit is the technical system to be controlled by the RCP test unit. This control of the previously available control unit results in a modification of the control method of the previously available control unit, making it possible to test a new control functionality by means of the externally connected RCP test unit.

For example, sensors or actuators may be used as the device or more complex systems such as, e.g., a complete engine, or any technical system in a test bench.

The modifications, further features, and effects described above with respect to the method for generating a model executable on a test unit apply analogously to the examples, in which the method is not used as part of an HIL simulation but as part of a rapid control prototyping test.

Both submodels, executable models, and devices may be present in the form of virtual electronic control units. A virtual control unit can be understood in this case to be a (sub-) program code or an algorithm that is to be implemented on a control unit to be developed.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 4 shows the generation of a model executable on a test unit according to an exemplary embodiment of the invention in a flow diagram.

DETAILED DESCRIPTION

Figure 1:
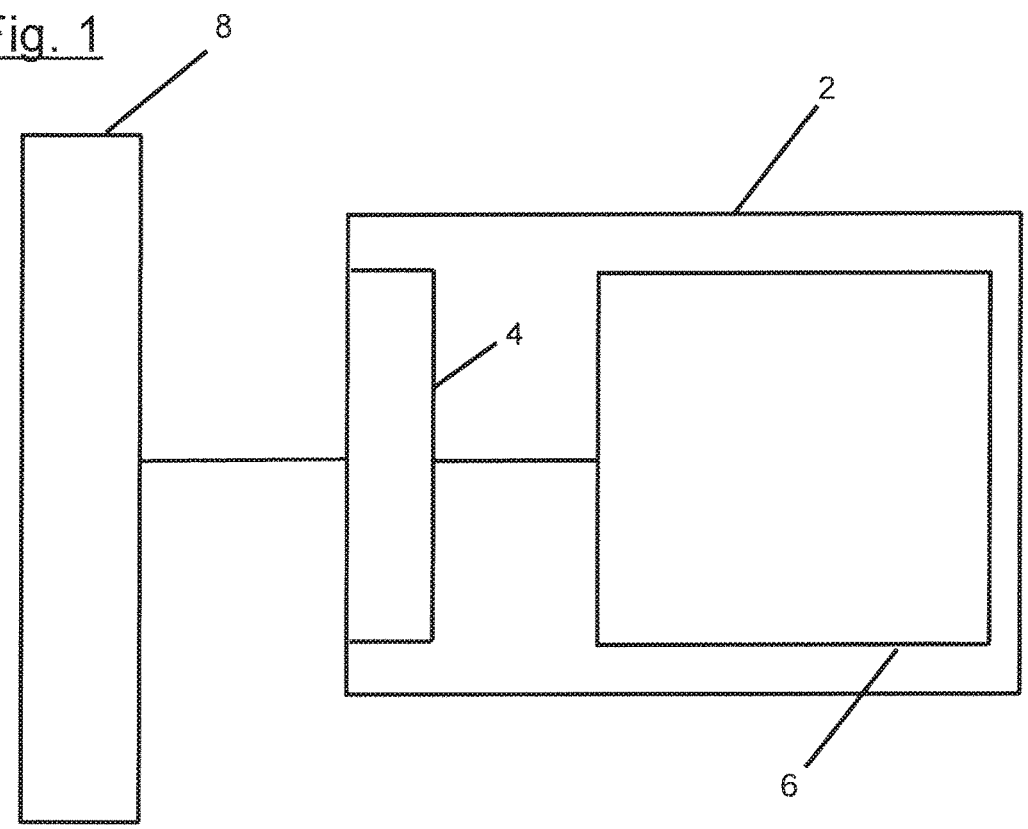
FIG. 1 shows a test unit with a control unit to be tested, connected thereto, in a block diagram, wherein a method for generating a model executable on the test unit according to an exemplary embodiment of the invention can be carried out on the test unit.

FIG. 1 shows a test unit 2, which in the present case is a HIL simulator 2. HIL simulator 2 has a physical interface 4, via which external units can be connected to HIL simulator 2. In FIG. 1, a control unit 8 is connected to physical interface 4. In the example of FIG. 1, control unit 8 is an engine control unit set up to control the engine of a motor vehicle. HIL simulator 2 is set up for testing engine control unit 8.

HIL simulator 2 contains a model 6 of a technical system. In the example of FIG. 1, model 6 is a model of a combination of an engine and a transmission. Model 6 is present as a software model and can exchange data with physical interface 4. This results in a data link between control unit 8 and model 6, by which the interaction of these two components can be simulated and tested. In this case, physical interface 4 takes over the transition between the physical signals transmitted from and to the control unit and the logical, i.e., software-based, signals exchanged within HIL simulator 2.

The HIL simulator is real-time-capable. Thus, control unit 8 can be tested without further adaptation, in other words, in its configuration used later in operation. HIL simulator 2 interacts with control unit 8 at the speed that a representationally present technical system would have, in the present case, a combination of a real engine and transmission of a motor vehicle. This in turn means that the behavior of model 6 is also calculated at at least this speed. Model 6 is an executable model; i.e., model 6 is present in a compiled form and can be executed on the hardware of HIL simulator 2.

Figure 2:
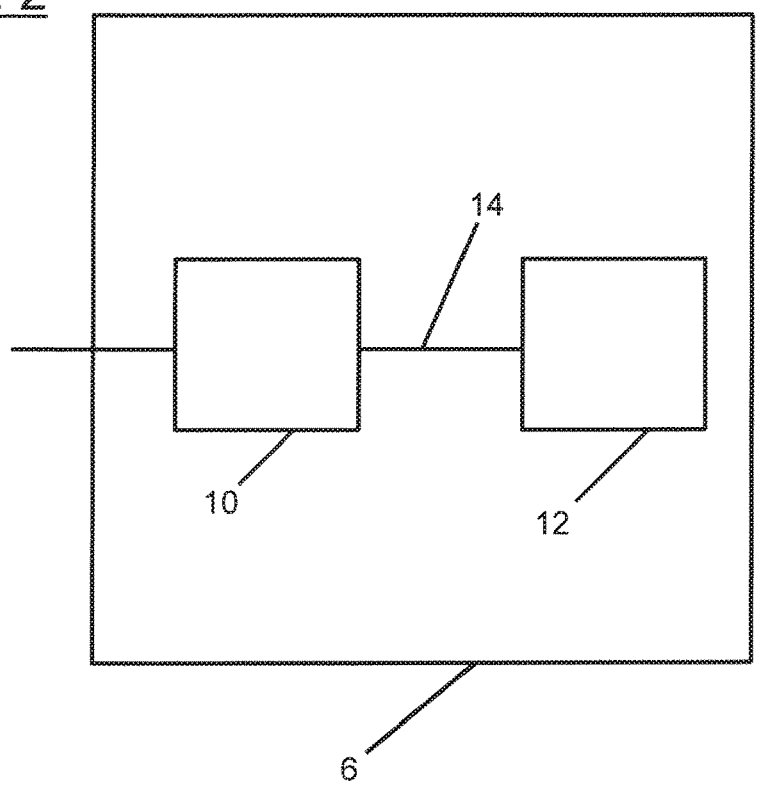
FIG. 2 shows in a block diagram a technical system model generated by a method according to exemplary embodiments of the invention, the model of the technical system having two executable submodels.

FIG. 2 shows model 6 of the technical system of FIG. 1 in greater detail. Model 6 has two executable submodels 10 and 12, namely a first executable submodel 10 and a second executable submodel 12. The first executable submodel 10 is a model of the engine to be controlled by engine control unit 8. The first executable model 10 is connected to physical interface 4 and can communicate via it with control unit 8. The second executable submodel 12 is a model of the transmission of the motor vehicle. There is a real-time-capable communication link 14 between first executable submodel 10 and second executable submodel 12. The generation of model 6 from first executable submodel 10 and second executable submodel 12 by establishing the real-time-capable communication link 14 will be described in detail below.

In the present example, first submodel 10 and second submodel 12 are executed during the simulation on separate processors. Thus, the calculations for first submodel 10 and second submodel 12 can be carried out completely in parallel. It is also possible that first submodel 10 and second submodel 12 are executed on the same processor but in separate processor cores. It is possible in addition for first submodel 10 and second submodel 12 to have different address spaces, wherein they are executed on the same processor or on different processors.

Model 6 is considered to be a model of a technical system to be controlled. It is irrelevant for this that only the first executable submodel 10 is controlled directly by control unit 8. Control unit 8 has influence on the entirety of the combination of engine model and transmission model via the first executable submodel 10. Second executable submodel 12, i.e., the transmission model, is a model of the environment of the engine and can therefore also be referred to as an environmental model. It is emphasized that the method described below for generating a model executable on a test unit can be used not only for technical systems to be controlled but for any type of executable technical system models executed on a test unit. It is irrelevant in this case for the course of the process whether or not the executable models contain components to be controlled.

For the clearest possible illustration of an exemplary embodiment of the invention, only engine model 10 and transmission model 12 are shown in FIG. 2. However, it will be apparent to the skilled artisan that other executable submodels may be present in the HIL simulator from which model 6 of the technical system, i.e., the model of the overall technical system, may be generated.

Figure 3:
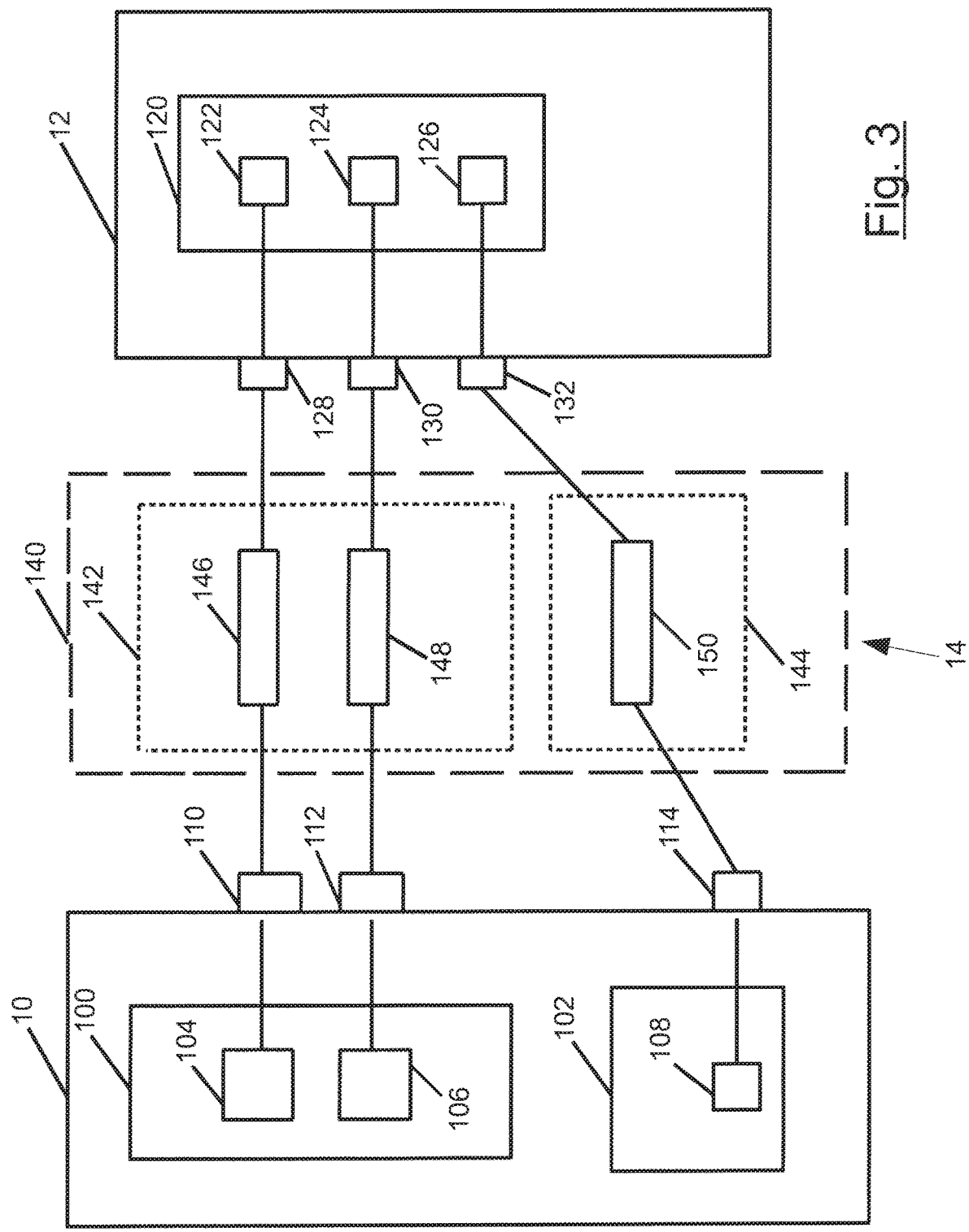
FIG. 3 shows the executable submodels of FIG. 2 and the communication link between the executable submodels in greater detail.

FIG. 3 shows first executable submodel 10 and second executable submodel 12 in greater detail, with communication link 14 between the submodels being discussed in particular. The first executable submodel 10 has a first conditionally executable component 100 and a second conditionally executable component 102. The first conditionally executable component 100 is a model of an internal combustion engine. The second conditionally executable component 102 is a model of an electric motor. Thus, first executable submodel 10 is a model of a hybrid engine. The term 'conditionally executable component' can refer to a subcomponent of an executable submodel. The word 'conditionally' signifies that the model of the corresponding subcomponent is executed only in certain operating situations, such as, e.g., when the electric motor is switched on, or the behavior is calculated only for specific events or that the model otherwise depends on some conditions. In the individual case, it is also possible that a conditionally executable component is constantly executed. However, the term signifies that the execution of the model of the respective components can depend on one or more conditions.

The first conditionally executable component 100 has a first variable 104 and a second variable 106. First variable 104 is the speed of the internal combustion engine. Second variable 106 is the torque of the internal combustion engine. The second conditionally executable component 102 has a third variable 108. Third variable 108 is the additional torque of the electric motor.

Furthermore, first executable submodel 10 has a first communication interface 110, a second communication interface 112, and a third communication interface 114. First variable 104, second variable 106, and third variable 108 are communicated to second executable submodel 12 via these communication interfaces during the simulation, as described in detail below.

Second executable submodel 12 has a third conditionally executable component 120. Third conditionally executable component 120 has a fourth variable 122, a fifth variable 124, and a sixth variable 126. Fourth variable 122 is the speed of the internal combustion engine, fifth variable 124 is the torque of the internal combustion engine, and the sixth variable 126 is the additional torque of the electric motor. Third conditionally executable component 120 is a model of the transmission which models the behavior of the transmission based on the values, obtained from the engine, for the variables. Furthermore, second executable submodel 12 has a fourth communication interface 128, a fifth communication interface 130, and a sixth communication interface 132, via which the data are received from executable submodel 10 and passed to third conditionally executable component 120.

First data 146 are transmitted from first communication interface 110, which is connected to first variable 104, to fourth communication interface 128, which is connected to fourth variable 122. Second data 148 are transmitted from second communication interface 112, which is connected to second variable 106, to fifth communication interface 130, which is connected to fifth variable 124. Third data 150 are transmitted from third communication interface 114, which is connected to third variable 108, to sixth communication interface 132, which is connected to sixth variable 126.

First data 146 and second data 148 come from the same conditionally executable component 100 and relate to the same point in time in the simulated time. Therefore, first data 146 and second data 148 are combined into a first consistency buffer 142. Third data 150 come from another conditionally executable component, namely from second conditionally executable component 102. As stated above, second conditionally executable component 102, which is a model of an electric motor, is executed only when the electric motor is turned on. As a result, third data 150 are not always available. It is possible in addition that the simulated time of second conditionally executable component 102 is not exactly synchronized with the simulated time of first conditionally executable component 100 or that the iteration steps of conditionally executable components 100, 102 are not performed the same number of times. For these reasons, third data 150 are provided in their own second consistency buffer 144. This division into separate consistency buffers signifies that perfect data consistency in the sense of real-time-capable simulation between the two consistency buffers 142 and 144 is not necessarily present. In general, consistency buffers can refer to data that are transmitted together and belong to the same point in time in the simulated time. Splitting into consistency buffers achieves the best possible realization of data consistency, because the partially executed parts can be triggered asynchronously.

First consistency buffer 142 and second consistency buffer 144 are combined into a communication packet 140, which is transmitted from first executable submodel 10 to second executable submodel 12. The term 'communication packet' can refer to the transmission of a data unit that is transmitted from first executable submodel 10 as a sender to second executable submodel 12 as a receiver. The totality of the data transmission construction can be referred to as communication link 14.

The receiving mode of second executable submodel 12 is continuous; i.e., second executable submodel 12 receives all data incoming via communication link 14. Third conditionally executable component 120 processes the incoming data regardless of whether or not they differ from previously received data. This makes sense in the present case, in particular because it may be that no third data 150 are transmitted, but first data 146 and second data 148 change over the course of the simulation. Such a continuous receiving mode is also described as "non-blocking" or asynchronous. In contrast, there is also an event-driven receiving mode in which the receiving executable submodel reacts only to changes in the transmitted data. A receiving mode of this type can also be referred to as "blocking" or synchronous, because unchanging data are blocked by a conditionally executable component before being processed.

It is evident that the two executable submodels 10 and 12 can exchange much more data in addition to the data transfer described above. This data exchange can proceed in both directions. Merely for reasons of the clarity of the explanations of communication link 14, the description has been limited to the three variables: speed of the internal combustion engine, torque of the internal combustion engine, and the torque of the electric motor.

FIG. 4 illustrates a method for generating executable model 6, as described above, according to an exemplary embodiment of the invention. The starting point of the method is first executable submodel 10 and second executable submodel 12. The two executable submodels are each associated with a metafile. In particular, first executable submodel 10 is associated with a first metafile 10a. Second executable submodel 12 is associated with a second metafile 12a. First and second metafiles 10a, 12a contain descriptions of the communication characteristics of first executable submodel 10 and second executable submodel 12. For each variable, to be communicated, of first executable submodel 10, first metafile 10a contains the communication direction, data type, data width, and the assignment to a conditionally executable component of first executable submodel 10. Likewise, for each variable to be communicated, second metafile 12a contains the communication direction, data type, data width, and the assignment to a conditionally executable component of second executable submodel 12. Thus, metafiles 10a and 12a contain the information, locally relevant to the submodels, for providing communication between different submodels.

In a first processing step 20, first metafile 10a and second metafile 12a are coupled to communication definitions 16. The submodels that are to communicate with each other, data that are to be bundled into communication packets, and the receiving mode in which the data are to be received are defined in communication definitions 16. In the present case, communication definitions 16 are a file containing a description of the following information: first executable submodel 10 communicates with second executable submodel 12; all data to be transmitted from first executable submodel 10 to second executable submodel 12 are bundled into a communication packet; second executable submodel 12 continuously receives the data.

A mapping file 18, containing a description of the communication interfaces to be configured later and the communication link to be established later between the submodels, is created from the combination of the information of first metafile 10a, the information of second metafile 12a, and communication characteristics 16. Mapping file 18 has a defined format that contains the entire information that will be necessary later for linking the two executable submodels 10, 12.

In a second processing step 22, the above-described model 6, which contains first executable submodel 10, second executable submodel 12, the respective communication interfaces, and the real-time-capable communication link 14, is generated from first executable submodel 10, second executable submodel 12, and mapping file 18. The information for configuring the communication interfaces and establishing real-time-capable communication link 14 comes from mapping file 18. During the simulation, the communication between first executable submodel 10 and second executable submodel 12 proceeds as described above with respect to FIG. 3.

The intermediate step via mapping file 18 is optional. It is also possible that model 6 is generated directly from the information of first metafile 10a, second metafile 12a, and communication definitions 16. Furthermore, first metafile 10a and second metafile 12a are only one of many ways in which the information on the variables, to be communicated, of the executable submodels can be provided. The combination of an executable submodel and a metafile associated therewith may be generated during the compiling of a high-level-language submodel.

The term 'high-level-language submodel' here can mean that the submodel is present in a high-level programming language. A high-level programming language, also known as "higher programming language," is a programming language for writing a computer program that is markedly far from the level of machine languages in terms of abstraction and complexity. Examples of high-level programming languages are C, C++, Java, or also scripting languages such as Python, Javascript, M-Code (MATLAB code), or graphical programming languages such as Simulink and Labview as well.

Figure 5B:
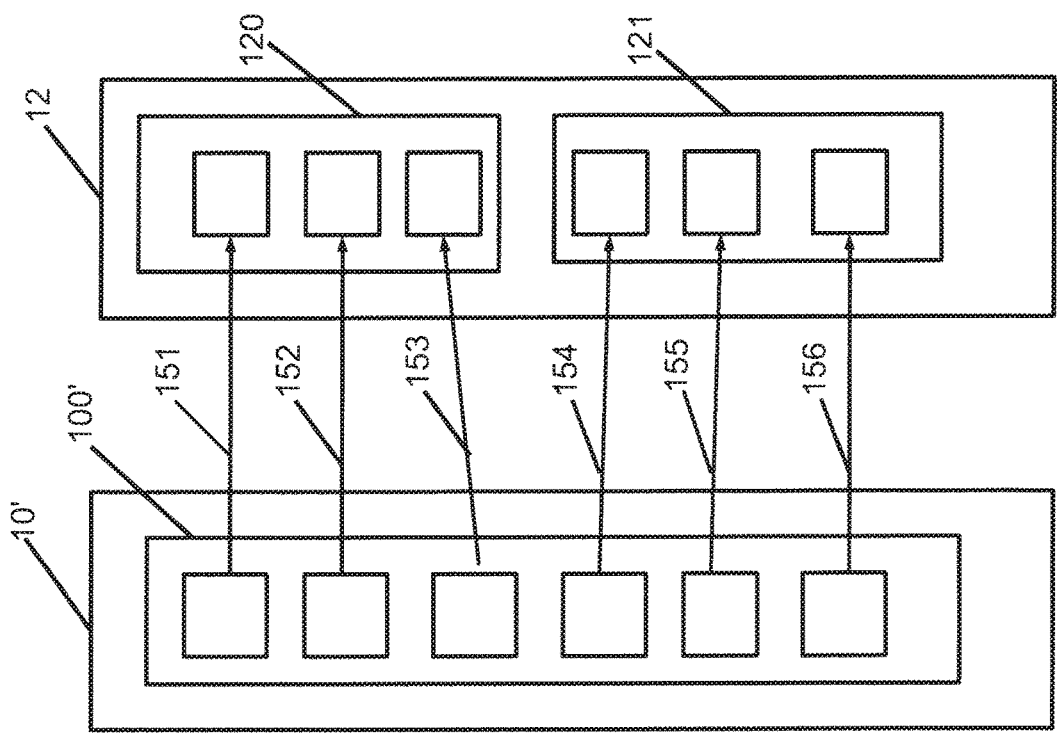
FIGS. 5a and 5b show a further example of two executable submodels and their communication link.
Figure 5A:
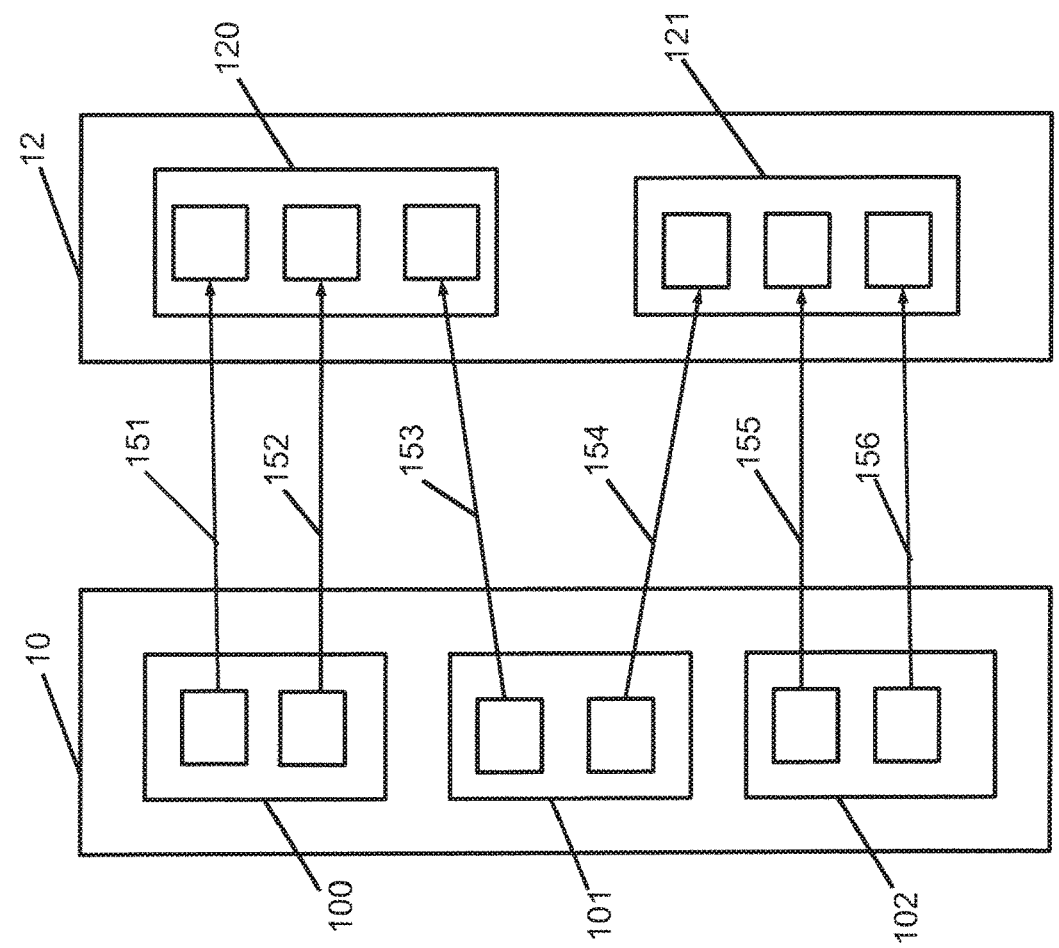

FIG. 5 shows a further example of the communication between two executable submodels. In particular, it will be illustrated with reference to FIG. 5 how the exchange of already compiled, executable submodels is made possible by the late establishing of communication links between the submodels. Whereas FIG. 5A shows the situation before the replacement of an executable submodel, FIG. 5B shows the situation after the replacement of the executable submodel.

FIG. 5A shows a first executable submodel 10 and a second executable submodel 12. First executable submodel 10 has a first conditionally executable component 100, a second conditionally executable component 101, and a third conditionally executable component 102. Second executable submodel 12 has a fourth conditionally executable component 120 and a fifth conditionally executable component 121.

First data 151 and second data 152 are transmitted from the first conditionally executable component 100 to the fourth conditionally executable component 120. First data 151 and second data 152 are organized in a first consistency buffer. Third data are transmitted from second conditionally executable component 101 to fourth conditionally executable component 120. Third data 153 form a separate, second consistency buffer. First consistency buffer and second consistency buffer are transmitted together as a data packet.

Fourth data 154 are transmitted from second conditionally executable component 101 to fifth conditionally executable constituent 121. Fourth data 154 form their own, third consistency buffer. Fifth data 155 and sixth data 156 are transmitted from third conditionally executable component 102 to fifth conditionally executable component 121. Fifth data 155 and sixth data 156 form a fourth consistency buffer. The third consistency buffer and fourth consistency buffer are transmitted together in a second communication packet.

For more details on the communication, in particular regarding the communication interfaces of first executable submodel 10 and second executable submodel 12, reference is made to the above description of FIG. 3. The statements there apply analogously to FIG. 5.

FIG. 5B now shows the situation that first executable submodel 10 has been replaced by a modified first executable submodel 10'. The modified first executable submodel 10' is characterized in that it contains only a first conditionally executable component 100'. This first conditionally executable component 100' transmits all the above data, i.e., first data 151, second data 152, third data 153, fourth data 154, fifth data 155, and sixth data 156. Because the data now all come from one conditionally executable component, they are transferred with only two consistency buffers. In particular, first data 151, second data 152, and third data 153 form a first consistency buffer, whereas fourth data 154, fifth data 155, and sixth data 156 form a second consistency buffer. The data of each consistency buffer are organized in a separate data package.

It is clear from the comparison of FIG. 5A and FIG. 5B that the communication between first executable submodel 10 and second executable submodel 12, in particular the communication interfaces of first executable submodel 10 and the real-time-capable communication link between the submodels, are constructed differently. The communication interfaces and the real-time-capable communication link are adapted to the modified embodiment of first executable submodel 10. It thus becomes clear that the method for generating an executable model according to exemplary embodiments of the invention enables the replacement of already compiled, executable submodels, where the communication between different submodels is adapted thereto and a recompilation of the submodels is not required. In addition, the method for generating an executable model according to exemplary embodiments of the invention enables a change in the desired communication using the communication definitions after the submodels are compiled.

Although the invention has been described with reference to exemplary embodiments, it will be apparent to those skilled in the art that various changes may be made and equivalents may be employed without departing from the scope of the invention. The invention should not be limited by the specific embodiments described. Rather, it includes all embodiments that fall under the appended claims.

What is claimed is:

1. A method implemented by at least one processor for generating a technical system model executable on a test unit, the test unit and the executable model adapted for real-time-capable testing of a control unit connectable to the test unit, the executable model being formed of a plurality of executable submodels communicating with each other, each executable submodel has a separate address space and/or is executed on a separate processor or separate processor core when a test of a control unit connected to the test unit is being run, the method comprising:
   compiling the plurality of executable submodels of the executable model from high-level-language submodels;
   identifying communication characteristics of a particular executable submodel for each of the plurality of executable submodels;
   accessing communication definitions for the communication between the executable submodels;
   configuring communication interfaces of the plurality of executable submodels based on the communication characteristics of the executable submodels and the communication definitions for the communication between the executable submodels; and
   establishing at least one real-time-capable communication link between the executable submodels based on the communication characteristics of the executable submodels and the communication definitions for the communication between the executable submodels.

2. The method according to claim 1, wherein the step of identifying the communication characteristics of the particular executable submodel includes analyzing a metafile associated with the particular executable submodel.

3. The method according to claim 2, further comprising compiling at least one high-level-language submodel into at least one executable submodel of the plurality of executable submodels and generating at least one metafile associated with the at least one executable submodel, during the compilation.

4. The method according to claim 1, wherein the step of accessing communication definitions for the communication between the executable submodels includes receiving at least one user input of communication definitions.

5. The method according to claim 1, wherein the technical system model executable on the test unit is a model of a technical system to be controlled.

6. The method according to claim 1, wherein the at least one real-time-capable communication link between executable submodels is established for a consistent data transmission via consistency buffers and communication packets.

7. The method according to claim 1, wherein each communication interface of the plurality of executable submodels is configured with respect to at least one of the following parameters:
   communication direction;
   data type;
   data width; or
   assignment to a conditionally executable component of the submodel.

8. The method according to claim 1, wherein the communication definitions for at least one instance of a communication between the executable submodels comprise at least one of the following parameters:
   specifying at least two executable submodels of the executable submodels communicating with each other;
   bundling communication data and/or communication receivers in communication packets; or
   defining a receiving mode, and differentiating between a continuous and a event-controlled receiving mode of the receiving mode.

9. A method for generating a technical system model executable on a test unit, the test unit and the executable model adapted for real-time-capable testing of a control unit connectable to the test unit, the executable model being formed of a plurality of executable submodels communicating with each other, each executable submodel has a separate address space and/or is executed on a separate processor or separate processor core when a test of a control unit connected to the test unit is being run, the method comprising:
   identifying communication characteristics of a particular executable submodel for each of the plurality of executable submodels;
   accessing communication definitions for the communication between the executable submodels;
   configuring communication interfaces of the plurality of executable submodels based on the communication characteristics of the executable submodels and the communication definitions for the communication between the executable submodels; and
   establishing at least one real-time-capable communication link between the executable submodels based on the communication characteristics of the executable submodels and the communication definitions for the communication between the executable submodels,
   wherein the configuring of the communication interfaces and the establishing the at least one real-time-capable communication link are performed at runtime of a test of the control unit connected to the test unit during an initialization phase of the test of a control unit connected to the test unit.

10. The method according to claim 1, further comprising:
creating a mapping file based on the communication characteristics of the executable submodels and the communication definitions for the communication between the executable submodels, wherein the mapping file contains submodel-internal information and information for inter-submodel communication, and
configuring the communication interfaces of the plurality of executable submodels and establishing the at least one real-time-capable communication link between the executable submodels based on the mapping file.

11. The method according to claim 10, wherein the mapping file for the executable submodels functioning as a receiver comprises a specification for communication packets to be received.

12. The method according to claim 10, wherein the mapping file for the executable submodels functioning as a sender comprises a specification for data blocks to be transmitted together.

13. The method according to claim 12, wherein the data blocks to be transmitted together contain consistent data regarding the real-time-capable testing.

14. A system comprising:
at least two executable submodels of the technical system model executable on the test unit and performing the method of claim 1; and
a metafile associated with a first executable submodel of the at least two executable submodels and containing communication characteristics of the first executable submodel,
wherein a real-time-capable communication link for the first executable submodel is created according to the communication characteristics of the metafile based on communication definitions for communication between the first executable submodel and a second executable submodel of the at least two executable submodels.

15. A testing arrangement for real-time-capable testing of the control unit connected to the test unit and comprising: a plurality of systems according to claim 14.

16. A method for generating a technical system model executable on a test unit, the test unit and the executable model being designed for real-time-capable control of a device connected to the test unit, and the executable model being constructed from a plurality of executable submodels communicating with each other, wherein each executable submodel has a separate address space and/or is executed on a separate processor or separate processor core when a unit connected to the test unit is controlled, the method comprising:
compiling the plurality of executable submodels of the executable model from high-level-language submodels;
identifying communication characteristics of the particular executable submodel for each of the plurality of executable submodels;
accessing communication definitions for the communication between the executable submodels;
configuring communication interfaces of the plurality of executable submodels based on the communication characteristics of the executable submodels and the communication definitions for the communication between the executable submodels; and
establishing at least one real-time-capable communication link between the executable submodels based on the communication characteristics of the executable submodels and the communication definitions for the communication between the executable submodels.

17. The method according to claim 16, wherein the configuring of the communication interfaces and the establishing the at least one real-time-capable communication link are performed at runtime of a test of the control unit connected to the test unit during an initialization phase of the test of a control unit connected to the test unit.

18. The method according to claim 1, wherein the at least one real-time-capable communication link is directly between the executable submodels, transferring data packets between the communication interfaces of the executable submodels.

19. The method according to claim 16, wherein the at least one real-time-capable communication link is directly between the executable submodels, transferring data packets between the communication interfaces of the executable submodels.

* * * * *